(12) United States Patent
Lee et al.

(10) Patent No.: US 6,488,898 B1
(45) Date of Patent: Dec. 3, 2002

(54) PROCESS FOR PREPARING ACRYLONITRILE-STYRENE COPOLYMER

(75) Inventors: Hyung Sub Lee, Yeochon (KR); Yun Chang Jang, Yeochon (KR)

(73) Assignee: LG Chemical Ltd., Seoul (KR)

( * ) Notice: Subject to any disclaimer, the term of this patent is extended or adjusted under 35 U.S.C. 154(b) by 0 days.

(21) Appl. No.: 09/868,193

(22) PCT Filed: Dec. 18, 1998

(86) PCT No.: PCT/KR98/00439
§ 371 (c)(1),
(2), (4) Date: Jun. 15, 2001

(87) PCT Pub. No.: WO00/37515
PCT Pub. Date: Jun. 29, 2000

(51) Int. Cl.$^7$ ............................ C08F 212/10; C08F 6/10; C08F 2/02; C08F 2/04
(52) U.S. Cl. .......................... 422/134; 422/138; 526/88; 526/342
(58) Field of Search ................................. 422/134, 138; 526/88, 342

(56) References Cited

U.S. PATENT DOCUMENTS 4,542,196 A 9/1985 Morris et al.
4,795,780 A * 1/1989 Wingler et al.

FOREIGN PATENT DOCUMENTS

| DE | 246303 A1 | 6/1987 |
| GB | 2129816 | 5/1984 |

* cited by examiner

*Primary Examiner*—Tae H. Yoon
(74) *Attorney, Agent, or Firm*—Davidson, Davidson & Kappel, LLC

(57) ABSTRACT

Provided with a process for preparing acrylonitrile-styrene copolymer by a continuous bulk or solution polymerization including the steps of: (a) separately feeding 70 to 90 parts by volume and 10 to 30 parts by volume based on the total input of a raw material monomer into first and second reactors from a raw material monomer storing section via two feeding sections, wherein an output is issued from the second reactor as much as the input at the same time, (b) polymerizing the mixture of the raw material monomers in each reactor for 1.5 to 2.5 hours at a reaction temperature of 130 to 160° C. and under the pressure of 1.5 to 4 kg/cm$^2$ G to have conversion ratio of 80%; and (c) recycling part of the reaction solution from the first reactor to a separate mixer, mixing discharged solution from the second reactor and part of monomers directly supplied from one feeding section, and recycling the mixture to the first reactor.

4 Claims, 1 Drawing Sheet

US 6,488,898 B1

PROCESS FOR PREPARING ACRYLONITRILE-STYRENE COPOLYMER

TECHNICAL FIELD

The present invention relates to a process for preparing acrylonitrile-styrene copolymer. More particularly, it relates to a process for preparing acrylonitrile-styrene copolymer having an excellent color and mechanical property by continuous bulk or solution polymerization.

BACKGROUND ART

Acrylonitrile-styrene copolymer is widely used for many application as a plastic material having good transparency, chemical resistance and mechanical property.

It is desirable that such a copolymer as widely used for many applications should be colorless.

Acrylonitrile-styrene copolymer is generally prepared by bulk or solution polymerization in the continuous process. This preparation method is advantageous to prepare pure copolymer but presents problems in that the reaction solution is hard to mix uniformly with difficulty in controlling the reaction temperature when the reaction mixture has high viscosity. The viscosity of the reaction mixture increases with the conversion ratio.

Especially, the reaction mixture becomes more viscous at the next reactor with a plurality of reactors connected with one another in series.

For acrylonitrile-styrene copolymerization, the composition of polymers is determined by the composition of monomers participating in the polymerization reaction. and acrylonitrile and styrene monomer polymerize at different rate. Thus the monomer mixture initially fed into the reactor varies in composition throughout the reaction in the preparation of the copolymer, and correspondingly, the composition of polymers also changes.

For such reason, the acrylonitrile-styrene copolymer formed in the preparation process becomes a mixture that has the composition distribution in a range. If the reaction mixture is not well mixed or the reaction is not accomplished uniformly, the distribution of the molecular weight and composition of the copolymer becomes broader. Broad distribution of molecular weight and composition is undesirable because broad distribution of composition of acrylonitrile-styrene copolymer resin deteriorates the transparency, color and mechanical property of the shaped articles. It is thus importance that the distribution of composition and molecular weight of acrylonitrile-styrene copolymer should be narrow in order to obtain copolymer of high quality.

Another problem possibly encountered in the polymerization step of the preparation process is formation of gel-like polymer. The gel formed in the polymerization step is an insoluble substance containing much acrylonitrile and has a very low thermal stability, causing red and black spots on the shaped articles and deteriorating the external appearance of the articles.

Such a gel is formed due to non-uniform composition locally in the polymer mixture, especially with unbalanced composition caused by insufficient mixing of the polymerization solution and non-uniform reaction in the polymerization step. The gel is ready be formed in the apparatus for processing the vapor of monomer mixture.

The phenomena causing the prescribed problems are usually due to high viscous polymerization solution which is the feature of acrylonitrile-styrene bulk copolymerization.

Use of a solvent such as ethylbenzene or toluene in a large amount may solve the problem resulting from the use of a polymer solution of high viscosity but has limitations in that the yield of production is decreased and the load of devolatizer increases.

Many methods to maintain the conditions for reaction uniform have been suggested as follows in order to eliminate the problem caused by the characteristic of acrylonitrile-styrene copolymerization itself:

U.S. Pat. Nos. 4,524,196, 4,324,868 and 2,769,804 describe a method for maintaining polymerization uniform in the reactor by using a special catalyst, or recycling a part of polymer solution back to the reactor. U.S. Pat. No. 3,838,139 discloses a method for enhancing the efficiency of mixing the reaction solution with horizontally arranged cylinder-like mixers.

In addition, EU Patent No. 344,437 and U.S. Pat. No. 3,336,267 suggest the use of proper solvent to make the reaction solution uniform, and U.S. Pat. Nos. 4,328,327 and 4,141,934 and JP Patent No. 7-309905 describe a method for feeding the monomer in different composition into the respective reactors.

These conventional methods are effective to improve the problems partly but involve disadvantages such as use of very expensive equipment and complex preparation process.

Particularly, the method for feeding the monomer in different composition into the respective reactors is expected to compensate for the change of monomer composition with conversion ratio in the next step reactor, requiring a separate apparatus for varying the composition of monomers fed into the reactors with a consequence of an increase in the costs. This method is inapplicable to the actual preparation process because there exists a large difference in the composition of monomers between the liquid and gas phases in the reactor and the composition of monomers is hard to measure. Furthermore, for a polymerization of high level of acrylonitrile containing copolymer, the change in the composition becomes serious in the respective reactors. In proportion to this, the amount of styrene monomers to compensate is increased in which case the transparency is deteriorated when mixing the monomers is insufficient.

DISCLOSURE OF INVENTION

Accordingly, an object of the present invention is to provide a novel method for preparing acrylonitrile-styrene copolymer excellent in color, transparency and mechanical property by maintaining the conditions of polymerization uniform in the preparation process.

The acrylonitrile-styrene copolymer prepared by the present invention method is excellent in mechanical property such as strength, resistance to thermal discoloration, and contains less gel-like polymer, as a result of which injection molded articles made of the resin has an excellent external appearance.

To achieve these and other advantages and in accordance with the purpose of the present invention, as embodied and broadly described, a method for preparing acrylonitrile-styrene copolymer by a continuous bulk or solution polymerization includes the steps of: (a) separately feeding 70 to 90 part by volume and 10 to 30 part by volume based on the total feed monomer into the first and second reactors from a raw material monomer storing section via two feeding sections, the raw material monomer consisting of 50 to 90 part by weight of styrene, 10 to 50 part by weight of acrylonitrile, 0 to 30 part by weight of polymerization solvent, and 0 to 0.5 part by weight of chain transfer agent, wherein an output is issued from the second reactor as much as the input at the same time, (b) polymerizing the mixture of the raw material monomers in each reactor for 1.5 to 2.5 hours at a reaction temperature of 130 to 160° C. and under the pressure of 1.5 to 4 kg/cm² G to have conversion ratio of 80%; and (c) recycling part of the reaction solution from the first reactor to a separate mixer, mixing discharged solution from the second reactor and part of monomers directly supplied from one feeding section, and recycling the mixture to the first reactor.

It is to be understood that both the foregoing general description and the following detailed description are exemplary and explanatory and are intended to provide further explanation of the invention as claimed.

BEST MODE FOR CARRYING OUT THE INVENTION

Figure 1:
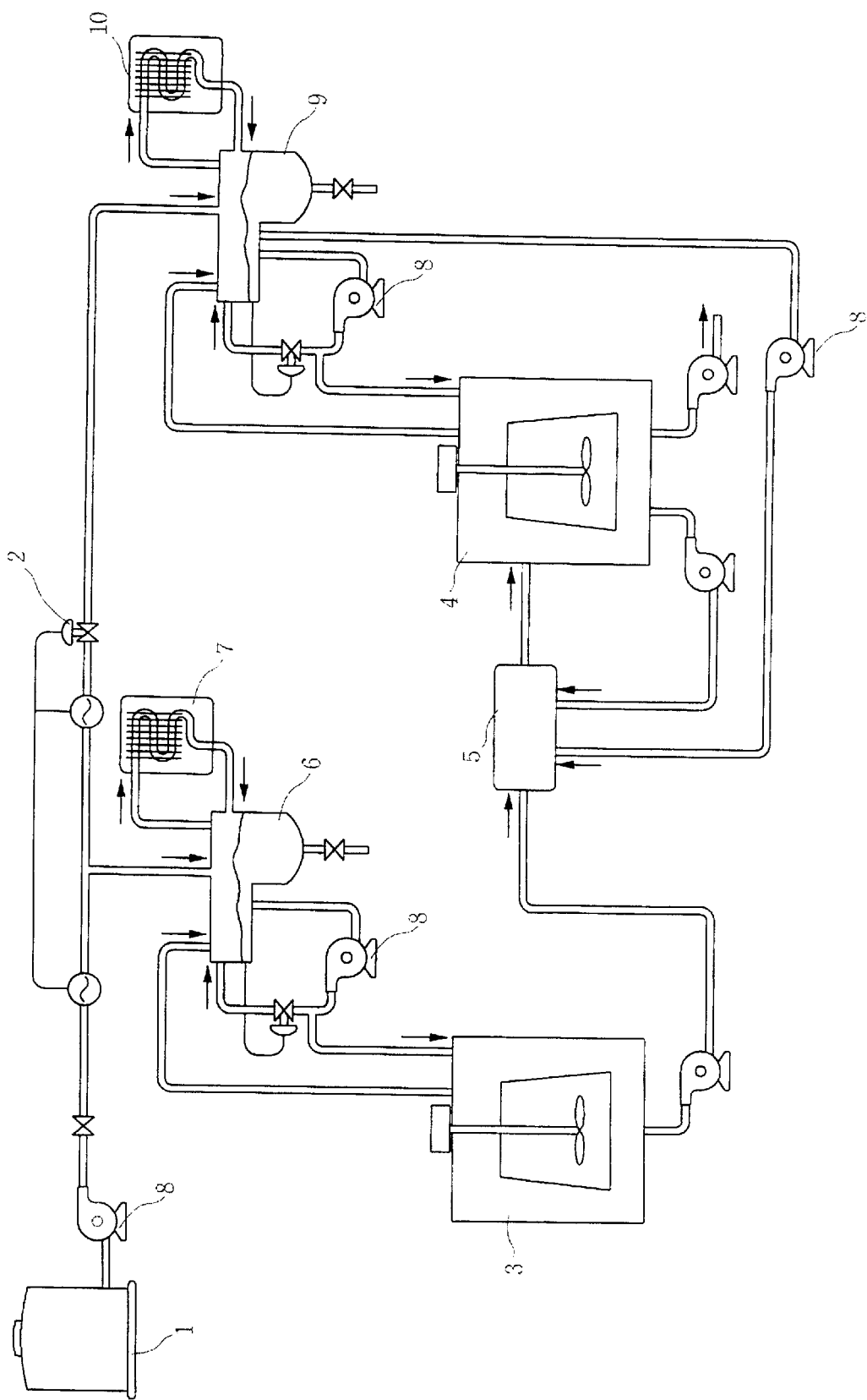
FIG. 1 is a flow chart illustrating a process for preparing acrylonitrile-styrene copolymer according to the present invention.

Reference will be made in detail to the preferred embodiments of the present invention, examples of which are illustrated in the accompanying drawing.

As described above, a process for preparing acrylonitrile-styrene copolymer according to the present invention includes a raw material feeding step, a polymerization step, and a recirculation step. A series of procedures participating in the preparation process will now be described in further detail with reference to FIG. 1.

In the raw material feeding step, a raw material is continuously fed into reactors 3 and 4 in which two continuous stirred tank reactor each having the shape of a vertical cylinder are arranged in series. The raw material used herein is a monomer mixture consisting of 50 to 90 part by weight of styrene, 10 to 50 part by weight of acrylonitrile, 0 to 30 part by weight of toluene or ethylbenzene as a polymerization solvent and 0 to 0.5 part by weight of di-t-dodecyl mercaptan as a chain transfer agent. Flow control valve 2 is controlled to feed monomers to the first and second reactors 3 and 4 at a predetermined ratio, for example, 70 to 90 part by volume of the total input monomers to the first reactor 3 and 10 to 30 part by volume of the monomers to the second reactor 4. An output discharged from the final reactor is equal in quantity to the input at the same time so that the process can be carried out continuously.

In such a case where monomers are fed into two reactors separately, it is possible to reduce the difference in the viscosity and composition of the polymer solutions between the two reactors, maintaining the conditions of reaction in the uniform liquid state.

That means, monomers are fed into the two reactors at a predetermined ratio such that the polymer portion containing in the polymer solution becomes increased in the first reactor 3 but decreases in the second reactor 4. Thus the difference in the viscosity and composition of the polymer solutions between the two reactors can be reduced so as to produce copolymer having uniform viscosity and composition.

Next, the polymerization step is performed to polymerize the monomers under the conditions of reaction such as specified temperature, pressure and retention time. Conversion ratio, molecular weight and composition of the produced polymers are determined by the conditions for polymerization. Preferably, the conditions of reaction are 130 to 160° C. of reaction temperature, 1.5 to 4 kg/cm² G of pressure and 1.5 to 2.5 hours of retaining time in each reactor, and the monomer-to-polymer conversion ratio is 80%.

The reaction temperature is controlled by the temperature difference between input monomers and output polymer solution, heat exchange with exterior part by jacket, and removal of latent heat of vaporization caused by vaporization of unreacted monomers and toluene or ethylbenzene as a solvent.

In particular, the reaction temperature can be controlled through removal of latent heat of vaporization in such a manner that the pressure is controlled to vaporize the monomers at a specified temperature. The vapor of monomers discharged from the reactors 3 and 4 is condensed in condensers 7 and 10 via decanters 6 and 9, stored in the decanters again and recycled to the reactors.

The problem often encountered in the polymerization step is formation of gel-like polymers and accumulation of water. The vapor of monomers generated from the reactors is so hot and has a high acrylonitrile content relative to the liquid monomer in reactor, and insoluble polymers containing much acrylonitrile can be generated while the vapor of monomers turns to liquid.

The vapor generated in the reactors flows into the condensers 7 and 10 via the decanters 6 and 9 and condensed as a liquid phase. The condensed liquid returns to the decanters 6 and 9, while monomers input as a raw material are also fed into the decanters 6 and 9. Pump 8 and flow control valve 2 are used to keep the level of feed monomer and condensate in the decanters 6 and 9.

This method enables the condensate in high acrylonitrile content and feed monomer to mix well, which reduces the difference in the compositions of the input monomers fed into the reactors and the liquid monomers remaining in the reactors, maintaining composition uniform.

Furthermore, the styrene content of the monomer storaged in decanter is higher than that of condensate having low affinity with water. As the result, it is easy not only to separate water from monomer in decanter but also to prevent gel-like polymer caused by high acrylonitrile content in monomer from formed.

The monomers stored in the decanters are preferably injected into the reactors through an injection nozzle in order to prevent polymerization on the inner surface of reactor wherein injected monomer come into contact with vapor.

Especially, mercaptan, chain transfer agent, contained in the injected monomer is effective to suppress formation of gel-like polymer.

There is no particular limitations upon the type of agitator used to agitate the mixture solution of high viscosity and a wide paddle type agitator is preferably used instead of helical ribbon type agitator that may cause partly non-uniform mixture.

The recycling step in the process for preparing acrylonitrile-styrene copolymer of the present invention includes recycling part of the reaction solution from the second reactor 4 to a static mixer 5 in which the reaction solution is admixed with the discharged solution from the first reactor 3 and part of monomers directly discharged from the second decanter 9, and returning the mixture to the second reactor 4.

The efficiency of mixing in the second reactor can be promoted by using the static mixer to mix the discharged solution of the first reactor 3, the recycling solution of the second reactor 4 and part of feed and reflux monomer from decanter 9.

The polymer discharged from the second reactor 4 is fed to the recovering step in which residual volatile such as styrene, acrylonitrile, solvent are removed, and then polymers undergo a processing step and the vapor of volatilized monomers is condensed at the condensers and reused in the raw material feeding step.

The process for preparing acrylonitrile-styrene copolymer of the present invention includes raw material feeding step, polymerization step, recycling step, recovering step and processing step that are all performed continuously. The most important characteristic of the present invention lies in the raw material feeding step, polymerization step and recycling step.

The following examples describe preferred embodiments of the present invention and should not be interpreted as limiting the scope of the invention.

[Embodiment 1]

A chain of procedures shown in FIG. 1 are performed with two serial reactors having the shape of a vertical cylinder.

Reactors 3 and 4 are each 40 l in volume. The total input of monomer mixture amounts to 15 l/hr and is injected into the first and second reactors 3 and 4 at a ratio of 13.5 l/hr and 1.5 l/hr, respectively.

The liquid level of the reaction solution is controlled to have 30 l in volume in each reactor.

The composition of the input monomer mixture is 70 part by weight of styrene, 30 part by weight of acrylonitrile, 30 part by weight of toluene and 0.15 part by weight of di-t-dodecyl mercaptan.

The reaction pressure is controlled to maintain the reaction temperature of each reactor at 150° C. and agitating speed.

Unreacted monomer of polymer solution discharged from a polymerizer is devolatilized in a devolatizer and the polymers are extruded in the form of pellet.

The pellet is analyzed with a gel permeation chromatography to determine the molecular weight and processed into a 0.1 mm thin film to measure the reflective index in order to determine the acrylonitrile content.

A specimen (length×width×thickness 80 mm×40 mm×3 mm) is made out of the pellet by injection molding to measure the physical properties according to ASTM D-1925. The tensile strength is measured in accordance with ASTM D-638.

To determine the content of gel polymer, 5 g of sample is completely dissolved in 95 g of tetrahydrofuran, removed of gel-like polymer with a 0.4 μm filter and weighed.

The results of the experiment are listed in Table 1.

The extracted gel-like polymer is in a white powder and turned reddish black when heated at 200° C. in a vacuum oven for 5 min. The acrylonitrile content is 40 wt. %.

[Embodiment 2]

This embodiment is performed according to the procedure of Embodiment 1 except that the input amount of monomers is 12 l/hr in the first reactor 3 and 3 l/hr in the second reactor 4. The results are listed in Table 1.

[Embodiment 3]

This embodiment is performed according to the procedure of Embodiment 1 except that the input amount of monomers is 10.5 l/hr in the first reactor 3 and 4.5 l/hr in the second reactor 4. The results are listed in Table 1.

[Comparative Example 1]

This example is performed according to the procedure of Embodiment 1 except that the input amount of monomers is 15 l/hr in the first reactor 3 without monomers input to the second reactor 4. The results are listed in Table 1.

[Comparative Example 2]

This example is performed according to the procedure of Comparative Example 1 except that the monomers are not fed by way of injection.

TABLE 1

|  |  | A | B | C | D | E |
|---|---|---|---|---|---|---|
| Input of Monomer (l/hr) | 1st Reactor | 13.5 | 12 | 10.5 | 15 | 15 |
|  | 2nd Reactor | 1.5 | 3 | 4.5 | 0 | 0 |
| Total Input of Monomer (l/hr) |  | 15 | 15 | 15 | 15 | 15 |
| Composition of Monomer (Part by Weight) | a | 30 | 30 | 30 | 30 | 30 |
|  | b | 70 | 70 | 70 | 70 | 70 |
|  | c | 30 | 30 | 30 | 30 | 30 |
|  | d | 0.15 | 0.15 | 0.15 | 0.15 | 0.15 |
| Input Technique (Injection) |  | Yes | Yes | Yes | No | No |
| Volume of Reaction Solution (l) | 1st Reactor | 30 | 30 | 30 | 30 | 30 |
|  | 2nd Reactor | 30 | 30 | 30 | 30 | 30 |
| Reaction Temperature (° C.) | 1st Reactor | 150 | 150 | 150 | 150 | 150 |
|  | 2nd Reactor | 150 | 150 | 150 | 150 | 150 |
| Result of Measurement | e | 24.5 | 24.6 | 24.5 | 24.2 | 24.2 |
|  | f | 130000 | 130000 | 132000 | 130000 | 130000 |
|  | g | 2.1 | 2 | 1.9 | 2.2 | 2.2 |
|  | h | 5.8 | 5.5 | 6 | 7 | 7.2 |
|  | i | 690 | 710 | 710 | 650 | 650 |
|  | j | 350 | 300 | 350 | 550 | 600 |

Note)
A: Embodiment 1
B: Embodiment 2

TABLE 1-continued

|   | A | B | C | D | E |
|---|---|---|---|---|---|

C: Embodiment 3
D: Comparative Example 1
E: Comparative Example 2
a: styrene
b: acrylonitrile
c: toluene
d: di-t-dodecyl mercaptan
e: acrylonitrile content (wt. %)
f: gravimetric average molecular weight
g: molecular weight distribution
h: yellow index
i: tensile strength (kg.cm/cm)
j: gel polymer content (ppm)

Table 1 shows that the acrylonitrile-styrene copolymer prepared according to the present invention has a good mechanical property, low color and low level of gel-like polymer content.

INDUSTRIAL APPLICABILITY

Such as in the present invention described above, the resin is prepared by separately feeding raw material monomers into reactors at a predetermined ratio, polymerizing the monomers to have the respective conversion ratios, mixing part of the polymerization product, discharged solution and monomers at a separate mixer, and recycling the mixture to the polymerization step. Thus prepared resin is excellent in mechanical property, resistant to thermal discoloration, and contains a gel-like polymer a little, as a result of which injection molded articles made of the resin has an excellent external appearance.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A process for preparing acrylonitrile-styrene copolymer by a continuous bulk or solution polymerization, the process comprising the steps of:

(a) separately feeding 70 to 90 part by volume and 10 to 30 part by volume based on the total input of a raw material monomer into first and second reactors from a raw material monomer storing section via two feeding sections, the raw material monomer consisting of 50 to 90 part by weight of styrene, 10 to 50 part by weight of acrylonitrile, 0 to 30 part by weight of polymerization solvent, and 0 to 0.5 part by weight of chain transfer agent, wherein an output is issued from the second reactor as much as the input at the same time, (b) polymerizing the mixture of the raw material monomers in each reactor for 1.5 to 2.5 hours at a reaction temperature of 130 to 160° C. and under the pressure of 1.5 to 4 kg/cm$^2$ G to have conversion ratio of 80%; and (c) recycling part of the reaction solution from the first reactor to a separate mixer, mixing discharged solution from the second reactor and part of monomers directly supplied from one feeding section, and recycling the mixture to the first reactor.

2. The process for preparing acrylonitrile-styrene copolymer as defined in claim 1, wherein said feeding the raw material monomers from each of two feeding sections to the respective reactors is performed by an injection technique.

3. The process for preparing acrylonitrile-styrene copolymer as defined in claim 1, wherein said reaction temperature is controlled selectively by the temperature difference between input raw material monomers and the issued polymerization solution, heat exchange with exterior by a jacket, or removal of latent heat of vaporization of unreacted monomers and a polymerization solvent.

4. The process for preparing acrylonitrile-styrene copolymer as defined in claim 3, wherein said latent heat of vaporization of the unreacted monomers and polymerization solvent is removed by controlling the pressure to vaporize the monomers at a specified temperature, condensing the vapor of monomers at a condenser section associated with the feeding sections, storing the condensed monomers in the feeding sections, and recycling them to the reactors.

* * * * *